No. 674,777. Patented May 21, 1901.
M. KUHN.
CONTROL AND GUEST'S PAY CHECK FOR HOTELS.
(Application filed Feb. 15, 1901.)

(No Model.)

| | B COUPON Nº 1<br>MAIN DINING ROOM<br>WAITER Nº 322 | CHECK Nº<br>799<br>b |
|---|---|---|
| | B COUPON Nº 2<br>MAIN DINING ROOM<br>WAITER Nº 322 | CHECK Nº<br>799<br>b |
| | B COUPON Nº 3<br>MAIN DINING ROOM<br>WAITER Nº 322 | CHECK Nº<br>799<br>b |
| | MAIN DINING ROOM<br>WAITER Nº 322 | CHECK Nº<br>799 |
| DEDUCTIONS | DATE | TABLE Nº |
| | A | |
| | TOTAL | |
| CHECK Nº<br>799 | C MAIN DINING ROOM<br>WAITER Nº 322 | TOTAL<br>d |

Witnesses:
John A. Pauleon
M. A. Helmke

Max Kuhn, Inventor
by Schreiter & Mathews
his Att'ys

UNITED STATES PATENT OFFICE.

MAX KUHN, OF NEW YORK, N. Y.

CONTROL AND GUEST'S PAY CHECK FOR HOTELS.

SPECIFICATION forming part of Letters Patent No. 674,777, dated May 21, 1901.

Application filed February 15, 1901. Serial No. 47,395. (No model.)

*To all whom it may concern:*

Be it known that I, MAX KUHN, of the city, county, and State of New York, have invented certain new and useful Improvements in Control and Guests' Pay Checks for Hotels, of which the following is a full, clear, and exact description, reference being had to the accompanying drawing, wherein my improved check is shown in plan view.
My invention relates to devices for controlling and checking the service to guests in hotels and other similar institutions; and it consists of the hereinafter-described coupon-check, the objects and advantages whereof will be hereinafter more fully explained.

In hotels, restaurants, and other large establishments the premises for the accommodation of guests are usually divided into several departments—as, for instance, dining-room, bar-room, cigar-stand, confectionery department, &c.—and in each of these departments a requisite number of waiters are stationed, who are there supervised by a checker. Each waiter is usually designated by number and is provided with correspondingly-numbered checks, whereon the orders given by the guests are entered in writing. These checks have printed thereon the number of the waiter, the number of the check, and usually also the designation of the establishment and a crest, monogram, or some symbol or mark. The order of a guest is written upon a space provided therefor in the body of the check. Those articles called for in the order which are obtainable in the department wherein the guest sits—as, for instance, articles of food in the dining-room— are obtained by the waiter and brought to the checker's table, presenting to the checker the check. The checker then scrutinizes the order, sees whether the articles on the tray are those called for by the order and nothing more, and then writes or stamps in the column provided therefor on the check the price of each article, whereupon the waiter takes up his check and tray again and serves the articles to the guest. These so-called plain or single orders are, however, infrequent. In most cases the orders call also for articles to be obtained from other departments—as, for instance, wine is frequently ordered with meals in the dining-room or some article of food ordered in the café or bar-room. In such cases the waiter must obtain from the checker a so-called "duplicate" check for such articles to be procured from some other department. These duplicate checks are consecutively-numbered checks given in charge of the checker in each department and usually designating the department, where they are issued, by number, name, or color. When a waiter presents to the checker an order calling for some articles to be obtained in another department, the checker fills out such duplicate check, writing thereon the number of the waiter, the number of the check containing the order, and the article called for by the order. Instead of stamping the amount (price) of the required article in the body of the waiter's (guest's) check, he writes opposite the item of the order, on the same line or lines, the number of the duplicate check given therefor. The waiter then takes up his check, together with the duplicate check, and proceeds to the department where the article called for by the order is to be obtained, obtains the article, and then presents himself with the checks and the articles thus obtained to the checker of that department. This checker revises the order and, satisfying himself that the article or articles obtained are those called for by the order, stamps the amount of the price thereof in the body of the waiter's (guest's) check and in the body of the duplicate check, retains the duplicate check, and returns the waiter's (guest's) check to him. This procedure is time-killing and fraught with dangers of errors. Its greatest defect is the delay in service and loss of time of employees which it involves. These so-called "mixed" orders are far in excess of the number of plain orders, and during meal-hours the whole service is often blocked up and the serving of guests woefully delayed while the checker's time is occupied by making out of the aforementioned duplicate checks. In such rush it also frequently occurs that the checker makes mistakes in writing the numbers upon the duplicate checks or the number of the duplicate checks in the waiter's (guest's) check. Such errors cause a very serious confusion in the control system and often entirely frustrate all efforts to maintain an efficient control. These mistakes are also almost impossible to discover and correct. The system of duplicate checks also involves the danger in that it gives dishonest waiters an opportunity to manipulate their orders by means of a bogus check. As a rule the checker in each department knows the waiters stationed in his department, but not the waiters serving in other departments. The practice requiring waiters to wear badges with their numbers displayed thereon is considered improper in first-class hotels and similar establishments, and though it tends to lessen the chance of dishonest practice on the part of waiters it does not prevent it, as my experience has shown. The checker cannot scrutinize the check or the duplicate check of a waiter of another department when submitted to him, as hereinbefore explained, and has no means to verify the correctness of their numbers. A clever dishonest waiter may, by manipulation, obtain such duplicate checks or take advantage of the error in writing the numbers thereon by the checker and by this means obtain articles without leaving any trace or clue which could be followed to detect him, and in case of collusion the fraud upon the proprietor of the establishment may be carried on almost indefinitely, one bogus check being sufficient for the purpose that may be used over and over again as long as it lasts or until the practice is discovered, there being no limit to the number of duplicate checks that a waiter may obtain or to the number of items that may be obtained upon one duplicate check, except the space. Waiters are responsible for the amounts on their (guests') checks, but they cannot be made responsible for the amounts charged up against them on the tally-sheets if those amounts do not appear also on their (guests') checks. It is probably not possible to devise an absolutely safe checking and controlling system and one that will also be practicable and expedient in service; but every device providing better safeguards or facilitating quicker service is of great pecuniary value to those engaged in the trade and still more to the public generally.

The object of my invention is to facilitate a speedy disposition of orders for articles from other departments by doing away with the necessity of the checker to make out so-called "duplicate" checks and the requisite entries thereon and in the waiter's (guest's) check and at the same time to eliminate the danger of fraud. For the attainment of these objects I have devised a coupon-check shown in the accompanying drawing. These checks consist of a body A, whereon are printed at the top thereof the designation of the room or department wherein the check is to be used, the number of the waiter, and the consecutive number of the check, and besides, also, the usual squares or spaces for date, &c. These numbers and designation may be printed thereon in any suitable arrangements. The space between the head and the bottom of the check is ruled, as shown in the drawing, and divided into two columns. In the wider column to the left the designations of the articles to be served are written by the guest or the waiter. The narrower column to the right is reserved for stamping or writing of the amounts—prices of the articles called for. Continuous with the body and adjacent to the head thereof, but divided therefrom and from each other by perforations or indentations a, a series of coupons B are provided, bearing the same designation and numbers as the heading of the body of the check, and besides these also blank squares b. The practical use of such check will be best understood from the following explanation: The check, as designated, is to be used in the main dining-room by waiter No. 322. The consecutive number of the check is 799. The guest receiving this check from the waiter orders, for instance, a beefsteak, boiled potatoes, celery, one pint of claret, two "Perfecto" cigars, and one cup of coffee. With the system of checks hereinbefore explained the checker in the main dining-room would be required to make out two duplicate checks—one for the bar-room, calling for one pint of claret, and another for the cigar-stand, calling for two "Perfectos"—and at the same time or on a second trip of the waiter he would have to revise the order from the kitchen comprising the beefsteak, boiled potatoes, celery, and the cup of coffee and stamp the prices of these articles in the right-hand column of the check opposite the designations of the articles called for in the order. Assuming that the checker would require only two minutes for disposing of this check and that only ten similar orders be submitted to him in succession, it will be seen that the waiter submitting the last order would have to wait twenty minutes before he could obtain the requisite duplicate checks, and it may be safely assumed that the checker in his desire to dispose of the waiters as speedily as possible cannot possibly spend any time on scrutinizing the checks and would probably make at least one mistake in writing the numbers of the duplicate checks in the waiter's (guest's) check or in writing the waiter's and check's numbers upon the duplicate checks. This is a very conservative estimate. Any one present at meal hours in any larger establishment knows that there are many more waiters employed and that as a rule each waiter attends two, three, and more guests at a time. If my improved check is used, the waiter does not need at all to stop to obtain duplicate checks from the checker, without which he otherwise could not obtain the articles outside of his department. He may and most likely would first depart to the kitchen, giving the order for the steak, boiled potatoes, celery, and a cup of coffee, and while this order is being prepared the waiter may run to the bar, obtain the pint of claret called for by the order, step up to the checker's desk in the bar department, submit the check to the checker, who has only to stamp the price of the pint of claret in the right-hand column of the body of the check and in the blank square $b$ of the coupon No. 1 and tear off that coupon as a receipt for himself for the order filled for another department. The waiter may then step over to the cigar-counter and obtain the two "Perfectos" called for in the order. The checker there stamps the price of the two cigars in the right-hand column of the body of the check and in the blank square $b$ of the coupon No. 2, tears off that coupon as a receipt for himself for the articles served in another department, and returns the check to the waiter, who then may go back to the kitchen, obtain the order there given before, pass to the checker's desk in his own department, who will only have to revise this part of the order, stamp the price of the articles in the right-hand column of the body of the check opposite to the designation thereof, and return the check to the waiter, who then will have the whole order completed. There is no delay, no unnecessary waiting in any place, and no mistakes can be made, except in stamping the price of the articles. Such mistakes are readily discovered and traced.

In addition to the coupons stub C may be provided at the bottom of the check, separated from the body thereof by perforated line $c$, which stub also bears the designation of the room or department wherein the check is to be used, the number of the waiter, and the consecutive number of the check and a blank square $d$. The object of this stub is to enable the waiter to prove that the order he served was paid or accounted for.

After an order is served the waiter figures up and writes out the total amount thereof in the body of the check and presents the same to the guest. He then receives the money therefor from the guest or obtains his signature thereto, if the amount is to be charged to him, and hands the check with the money (or the signature thereon) to the cashier, who stamps in the blank square $d$ of the stub the total amount of the check and, whether paid or charged, tears off the stub C and hands the same to the waiter to be retained by him as a receipt for the check, the cashier retaining the check. When the tally-sheets and the checks and the coupons come up in the accounting or controlling department, the coupons and the checks are readily assorted, the amounts stamped on the coupons readily compared and verified, and any fraud or error readily traced to its source. The only fraud possible in this system is of a dishonest waiter obtaining surreptitiously possession of a genuine check; but this check he could use only once and only for one purpose—namely, to obtain some article from another department. He could not use it in his own department and would be obliged to leave a part of it (the coupon) in the department that he defrauded, and this coupon would serve as a clue to discover the fraud. It is vastly more difficult for a waiter to obtain possession of a genuine check than it is for him to obtain possession of a dozen of duplicate checks upon his own genuine checks and dispose of them upon a bogus check.

My improved coupon-check cannot be manipulated by changing the numbers, whereas it is the easiest thing for a clever dishonest waiter to write in a duplicate check with pen or pencil the fictitious number of some check which he might have obtained or of a bogus check, and whereas in the first case he must leave the evidence of his fraud in the hands of the checker, and thus also destroy the utility of his fraudulent device, in the latter case there would be left no trace to discover the fraud. Moreover, if any check should be lost in the waiter's or cashier's hands the coupons are evidence that such checks were used, and the amount stamped on those checks can be readily discovered and verified from comparing the aggregate of remaining checks with the tally-sheets kept in each department.

I claim as my invention—

1. A check for hotels, restaurants and similar establishments, comprising a body portion containing the designation of the department, wherein the check is to be used and the number of the waiter and of the check and a space for writing or stamping thereon the items of an order and the price thereof; and a series of consecutively-numbered detachable coupons containing the same designation of the department wherein the check is to be used and the number of the waiter and of the check as the body portion of the check and a space for writing or stamping thereon the price of one or more items of an order.

2. A check for hotels, restaurants and similar establishments, comprising a body portion containing the designation of the department, wherein the check is to be used and the number of the waiter and of the check and a space for writing or stamping thereon the items of an order and the prices thereof; and a series of consecutively-numbered detachable coupons containing the same designation of the department, wherein the check is to be used and the number of the waiter and of the check as the body portion of the check, and a space for writing or stamping thereon the price of one or more items of an order arranged on one end of the body portion of the check, and a detachable coupon on the other end thereof, the latter coupon containing the designation of the department wherein the check is to be used and the number of the waiter and of the check, and a space for writing or stamping thereon the total of the amount of all items of the order written or stamped in the body portion of the check.

3. The combination with a check containing the designation of the department, wherein the check is to be used and the number of the waiter and of the check and a space for writing or stamping thereon the items of an order and the prices thereof; of a series of consecutively-numbered coupons containing the same designation of the department, wherein the check is to be used and the number of the waiter and of the check as the body portion of the check, and a space for writing or stamping thereon the price of one or more items of an order.

MAX KUHN.

Witnesses:
ROBERT VALENTINE MATHEWS,
JOHN A. PAULSON.